United States Patent [19]

Slocum, Jr.

[11] Patent Number: 5,361,649
[45] Date of Patent: Nov. 8, 1994

[54] BICYCLE CRANK AND PEDAL ASSEMBLY

[75] Inventor: Edwin J. Slocum, Jr., Mammoth Lakes, Calif.

[73] Assignee: High Sierra Cycle Center, Mammoth Lakes, Calif.

[21] Appl. No.: 219,612

[22] Filed: Mar. 28, 1994

Related U.S. Application Data

[63] Continuation-in-part of Ser. No. 916,902, Jul. 20, 1992, abandoned.

[51] Int. Cl.⁵ .............................................. G05G 1/14
[52] U.S. Cl. .................................. 74/594.2; 74/594.1; 482/57; 474/69; 474/70; 280/259
[58] Field of Search ........................... 74/594.1-594.6; 280/259, 261; 474/78-82, 69, 70; 482/57

[56] References Cited

U.S. PATENT DOCUMENTS

| | | |
|---|---|---|
| 573,055 | 12/1896 | Valentine . |
| 599,211 | 2/1898 | Williams . |
| 610,157 | 8/1898 | Campbell . |
| 669,542 | 3/1901 | Moore . |
| 709,934 | 9/1902 | Spence . |
| 721,739 | 3/1903 | Porter . |
| 2,533,011 | 12/1950 | Hill . |
| 2,783,044 | 2/1957 | Sbarra . |
| 3,190,149 | 6/1965 | Gorfin . |
| 3,396,988 | 8/1968 | Kroening . |
| 3,922,929 | 12/1975 | Marchello . |
| 4,164,153 | 8/1979 | Moritsch et al. . |
| 4,193,324 | 3/1980 | Mare . |
| 4,331,043 | 5/1982 | Shimano . |
| 4,446,753 | 5/1984 | Nagano . |
| 4,522,610 | 6/1985 | Nagano . |
| 4,606,241 | 8/1986 | Fredriksson . |
| 4,625,580 | 12/1986 | Burt . |
| 4,793,208 | 12/1988 | Bregnard et al. . |
| 4,816,009 | 3/1989 | Philipp . |
| 4,850,245 | 7/1989 | Feamster . |
| 4,882,945 | 11/1989 | Trevizo . |
| 4,915,374 | 3/1990 | Watkins . |
| 4,942,778 | 7/1990 | Bryne . |
| 4,960,013 | 10/1990 | Sander . |
| 5,044,226 | 9/1991 | Wu . |
| 5,060,536 | 10/1991 | Boys . |
| 5,067,370 | 11/1991 | Lemmens . |

FOREIGN PATENT DOCUMENTS

| | | |
|---|---|---|
| 978674 | 4/1951 | France . |
| 2576866A | 8/1986 | France . |
| 2584671A | 1/1987 | France . |
| 2801351 | 7/1978 | Germany . |
| 3743593A | 7/1989 | Germany . |
| 5510144 | 1/1980 | Japan . |
| 1-244994 | 9/1983 | Japan . |
| 1-197192 | 8/1989 | Japan . |
| 109085 | 11/1943 | Sweden . |
| 22228 | of 1896 | United Kingdom . |

Primary Examiner—Vinh T. Luong
Attorney, Agent, or Firm—Kelly, Bauersfeld & Lowry

[57] ABSTRACT

For bicyclists having one leg shorter than the other, a crank and pedal assembly is provided to more evenly distribute the forces exerted by both legs when pedaling a bicycle. The crank and pedal assembly includes a drive axle rotatably mounted on a bicycle frame, and a chainwheel eccentrically mounted on the axle. A pair of crank arms extend generally perpendicularly away from the drive axle in opposite directions from one another, and pedals are rotatably mounted to the free ends of each crank arm in a traditional manner. The pedals are so mounted, however, to position the bottoms of the balls of the rider's feet to be offset from the axis of rotation of the respective pedals by the same distance but in opposite directions when the crank arms are vertically disposed. More specifically, the pedals are mounted such that the balls of the rider's feet are each offset a distance equivalent to one-half of the difference in the lengths of the rider's legs. The pedal for the rider's shorter leg is mounted so as to position the ball of the respective foot above the pedal spindle. Conversely, the pedal for the rider's longer leg is mounted so as to position the ball of the respective foot below the pedal spindle.

17 Claims, 2 Drawing Sheets

BICYCLE CRANK AND PEDAL ASSEMBLY

RELATED APPLICATION

This is a continuation-in-part of U.S. patent application Ser. No. 07/916,902, filed Jul. 20, 1992 and entitled BICYCLE CRANK AND PEDAL ASSEMBLY now abandoned.

FIELD OF THE INVENTION

This invention relates generally to bicycles. More specifically, this invention relates to a bicycle crank and pedal assembly which provides smooth pedal motion for a rider having legs of different lengths.

BACKGROUND OF THE INVENTION

There are many different types of bicycles on the market today. For example, bicycles are available which have widely varying gear ratios, utilize materials ranging from steel to lightweight composites, and which include components tailored to match the rider's skill and expected use. Despite these differences, the underlying structure of most bicycles is essentially the same. A typical bicycle includes front and rear wheels rotatably mounted to a rigid frame, a seat disposed over a portion of the rear wheel and supported by the frame for supporting the rider, and handlebars connected through the frame to the front wheel for turning the bicycle. The bicycle is propelled by turning a chainwheel/sprocket mounted on an axle which rotates through a portion of the frame. The chainwheel/sprocket is linked to the rear wheel by a drive chain.

If a rider has one leg shorter than the other, it is difficult to get a proper fitting bicycle. The pedaling cadence or rhythm is also disturbed with resultant reductions in cycling power and speed. These reductions are particularly detrimental to the cycling performance of a racer. Prior attempts to compensate for the shorter leg and achieve smooth pedal motion have included the creation of orthopedic bike shoes and pedal lifts which effectively build up the shorter leg. In addition, riders have used spacer blocks, adjustable crank arms as described, for example, in U.S. Pat. No. 4,850,245, and pedals with various side plate heights.

These devices, generally, have affected the dynamics of the ride which is particularly unsatisfactory for the serious cyclist. For example, the cyclist can be forced to make a push/pull pedaling motion which feels clumsy and prevents efficient pedaling. Moreover, these devices often add weight to the rider or bicycle, making the devices less than desirable when optimal power and speed are desired. Thus, none of these devices has proven entirely satisfactory.

Accordingly, there has been a need for a novel bicycle crank and pedal assembly which compensates for a difference in the length of a rider's legs in order to permit smooth pedal motion. There is a further need for a crank and pedal assembly which can be easily customized for individual riders having a variety of leg length differences. Additionally, there is a need for a chain and pedal assembly wherein efficient pedaling cadence or rhythm can be maintained. Moreover, an assembly which equalizes the power or force between legs of different lengths is needed. The present invention fulfills these needs and provides other related advantages.

SUMMARY OF THE INVENTION

The present invention resides in an improved bicycle crank and pedal assembly which compensates for the difference in lengths of a cyclist's legs, to permit the more even application of force on the chainwheel while pedaling. This is particularly important in the sport of bicycle racing, in which smooth, steady and strong pedal motion is a requirement. The crank and pedal assembly comprises, generally, a drive axle rotatably mounted on a bicycle frame, and a chainwheel fixed to the drive axle. The chainwheel is adapted to pull a chain as the drive axle is turned to move the bicycle. A first crank arm has a first end mounted to one end of the axle, and extends generally perpendicularly thereto to a second free end. Similarly, a second crank arm h as a first end mounted to another end of the axle and extends generally perpendicularly thereto in an opposite direction relative to the first crank arm, to a second free end. Means are provided for positioning the bottoms of the balls of the rider's feet relative to the axle, to evenly distribute forces applied by the rider on the axle through the crank arms to move the bicycle.

In a preferred form of the invention, a first pedal is mounted to the second free end of the first crank arm by a pedal spindle, to accommodate the foot of the rider's shorter leg. The first pedal is mounted so as to position the bottom of the ball of the respective foot above the respective pedal spindle. Conversely, the second pedal is mounted to the second free end of the second crank arm by a pedal spindle, to accommodate the foot of the rider's longer leg. The second pedal is mounted so as to position the bottom of the ball of the respective foot below the respective pedal spindle.

The pedals are each mounted so as to position the foot-supporting upper surface of the pedal to be offset from the axis of rotation of the respective pedals by the same distance but in opposite directions when the crank arms are vertically disposed. The pedals are mounted to the crank arms such that their foot-supporting upper surfaces are each offset a distance equivalent to one-half of the difference in the lengths of the rider's legs. The center of the chainwheel is offset from the center of the axle by a distance equivalent to r'−r, wherein r' is determined by the formula $$r' = \frac{r(R + 1/2(O_1 + O_2))}{R}$$

wherein r=radius of the chainwheel, R=crank arm length measured from the center of the axle to the center of the pedal spindle, and $O_1$ and $O_2$ are the respective vertical offsets of the foot-supporting pedal upper surface from the respective pedal axis of rotation. In a cooperative arrangement, the chainwheel is offset in the direction toward the pedal for the shorter leg.

The first and second pedals are each mounted to the respective crank arms so as to account for the thickness of the rider's shoe soles. The intent is to position the bottoms of the balls of the rider's feet in precisely the desired position relative to the respective pedal spindle.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

As shown in the exemplary drawings, the present invention relates to a bicycle crank and pedal assembly that permits smooth pedal motion by a rider having one leg shorter than the other. The crank and pedal assembly is generally designated in the accompanying drawings by the reference number 10.

Figure 1:
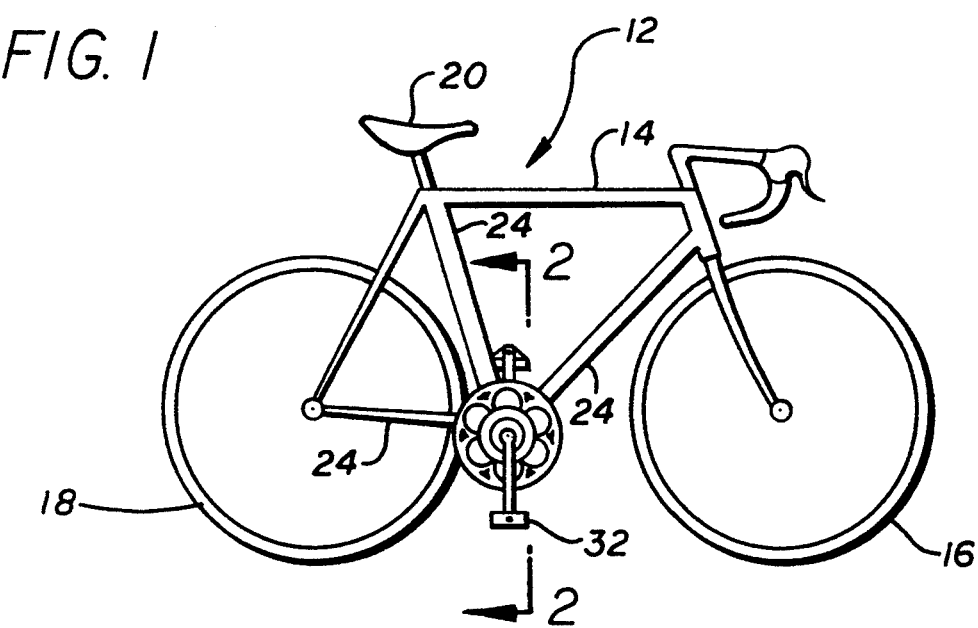
FIG. 1 is a right side elevational view of a typical bicycle having a crank and pedal assembly embodying the novel features of the present invention.

More particularly, and as is known in the art, the bicycle 12 shown in FIG. 1 comprises a rigid frame 14 constructed of a number of tubular sections, a front wheel 16, a back wheel 18, a seat 20, and a drive axle 22 (FIG. 2) rotatably mounted within a bottom bracket (not shown) of the bicycle 12. The bracket is supported by the frame tubular sections 24 below the seat 20. The typical crank and pedal assembly 10 for driving the bicycle 12 includes a chainwheel 26 rotatably mounted on the drive axle 22, the chainwheel 26 including a plurality of teeth 28 defining its circumference. A driving chain (not shown) is stretched across the teeth 28 to drive the bicycle 12 upon pedaling. A first crank arm 30 has a first end mounted to one end of the drive axle, and extends generally perpendicularly thereto to a second free end. Similarly, a second crank arm 31 has a first end mounted to another end of the axle and extends generally perpendicularly thereto in an opposite direction relative to the first crank arm 30, to a second free end. First and second pedals 32 and 33 are each rotatably disposed by a pedal spindle 34a and 34b at the respective second free ends of the crank arms 30 and 31 about an axis which is parallel to the longitudinal axis of the drive axle 22.

Figure 2:
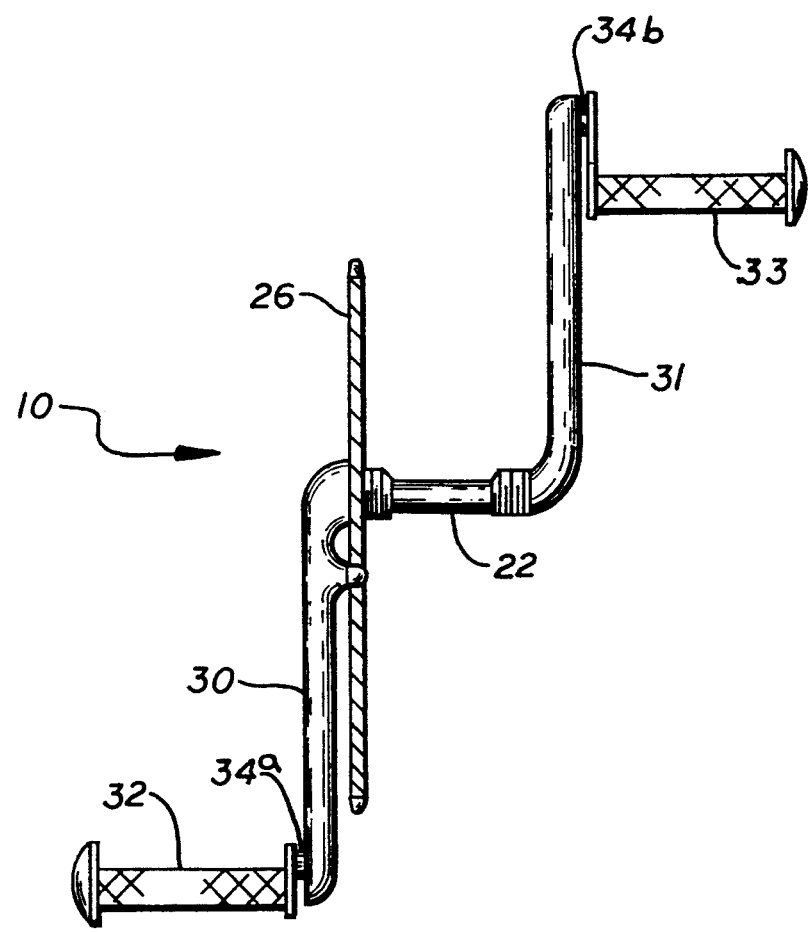
FIG. 2 is a front elevational and partially sectional view of the crank and pedal assembly, taken generally along the line 2—2 of FIG. 1.
Figure 3:
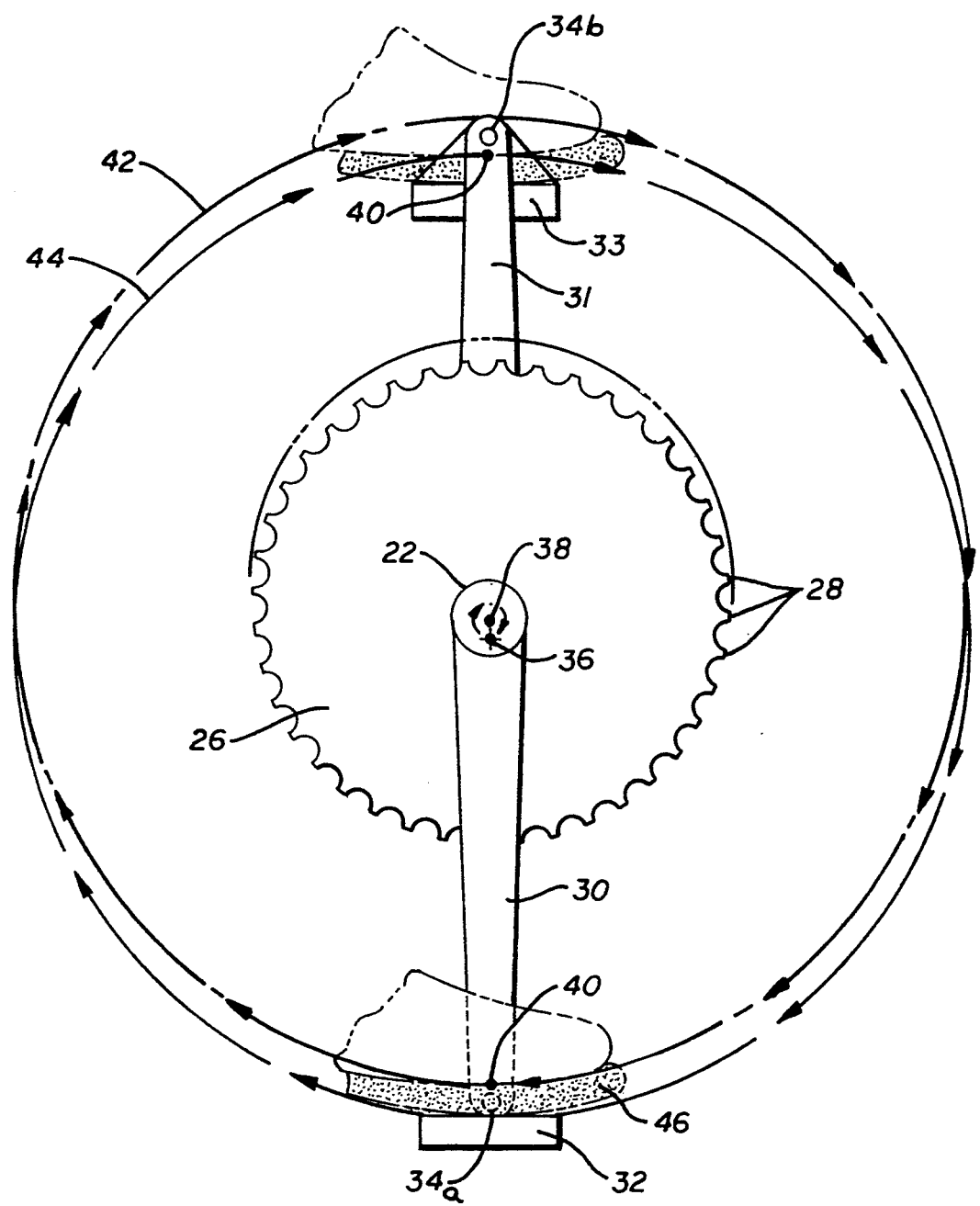
FIG. 3 is a schematic right side elevational view of the crank and pedal assembly of FIGS. 1 and 2, illustrating the manner in which a chainwheel is eccentrically mounted on a drive axle, and the manner in which pedals are rotatably mounted to crank arms to position the bottoms of the balls of the rider's feet to be offset from the axis of rotation of their respective pedals by the same distance but in opposite directions when the crank arms are vertically disposed.

The novel crank and pedal assembly 10 of the present invention provides an approach to compensate for a rider having legs of different lengths. With particular reference to FIGS. 2 and 3, the crank and pedal assembly includes a chainwheel 26 eccentrically mounted on the drive axle 22, and first and second pedals 32 and 33 disposed at the second free ends of the crank arms 30 and 31 at an offset position relative to their axis of rotation.

As shown in FIG. 3, the chainwheel 26 is eccentrically mounted on the drive axle 22 in a manner such that its geometric center 36 is offset from the center of the axle in a direction toward the pedal for the shorter leg. The chainwheel 26 and the crank arms 30 and 31 rotate about a common axis referred to by the reference number 38 defined by the center of the axle 22. Therefore, the radial distance from the center of the drive axle 22 to the periphery of the chainwheel 26 is not constant with the chainwheel mounted in the offset position as shown.

The first pedal 32 is mounted to the second free end of the first crank arm 30 by the pedal spindle 34a, to accommodate the foot of the rider's shorter leg. The first pedal 32 is mounted so as to position the bottom of the ball of the respective foot above the respective pedal spindle. Conversely, the second pedal 33 is mounted to the second free end of the second crank arm 31 by the pedal spindle 34b, to accommodate the foot of the rider's longer leg. The second pedal is mounted so as to position the bottom of the ball of the respective foot below the respective pedal spindle.

The pedals are each mounted so as to position the bottoms of the balls of the rider's feet as supported on the pedal upper surface to be offset from the axis of rotation of the respective pedals by the same distance but in opposite directions when the crank arms are vertically disposed. The pedals are mounted to the crank arms such that the bottoms of the balls of the rider's feet as supported on the pedal upper surface are each offset a distance ($O_1$ and $O_2$) equivalent to one-half of the difference in the lengths of the rider's legs. In a cooperative arrangement, the chainwheel is offset in the direction toward the pedal for the shorter leg.

The first and second pedals 32 and 33 are each mounted to the respective crank arms 30 and 31 so as to account for the thickness of the rider's shoe soles 46. The intent is to account for the thickness of the rider's soles, to position the bottoms of the balls of the rider's feet on the upper surface of the pedals in precisely the desired position relative to the respective pedal spindle 34a and 34b. The soles are typically ½ to ¾ inches thick, although they can be of any thickness as long as the difference between the foot-supporting upper surface of the pedal and the center of the pedal spindle is one-half the leg length difference.

The chainwheel 26 is mounted on the axle 22 such that the center of the chainwheel is offset from the center of the axle, preferably by a distance determined by the difference in lengths of the rider's legs. In this regard, the amount of chainwheel offset can be calculated by the formula $r' - r$, wherein $r'$ is determined by the formula $$r' = \frac{r(R + 1/2(O_1 + O_2))}{R},$$

wherein $O_1 + O_2$ is the sum of the vertical offsets of the foot-supporting upper surfaces of the pedals from the respective pedal axes of rotation, "r" is the radius of the chainwheel, and "R" is the crank arm length measured from the center of the axle to the center of the pedal spindle.

This formula is derived from the standard pulley formula:

$$F = \frac{Wr}{R}.$$

In this formula, "F" is the tangential force exerted on the crank arm through the pedal, "W" is the pulling force on the chain exerted by the chainwheel 26, "r" is the radius of the chainwheel, and "R" is the crank arm length measured from the center of the axle to the center of the pedal spindle.

For computational purposes, it is assumed that the value of the pulling force (W) on the chain exerted by the chainwheel is 1 lb. The value for the tangential force (F) exerted on the crank arm through the pedal can therefore be determined by dividing the crank arm length (R) into the radius of the chainwheel (r).

Once a value for the tangential force (F) has been determined, the amount of chainwheel offset can be calculated by the formula r′−r, wherein r′ is determined by the formula $$r' = \frac{F(R + 1/2(L_1 - L_2))}{W}.$$

$L_1 - L_2$ is the difference in the lengths of the rider's legs. Using $F = Wr/R$ with $W = 1$ lb. and $\frac{1}{2}(L_1 - L_2) = \frac{1}{2}(O_1 + O_2)$, the formula for r′ may be restated $$r' = \frac{r(R + 1/2(O_1 + O_2))}{R}.$$

In order to illustrate the foregoing concepts, the configuration of the novel bicycle crank and pedal assembly 10 will be described for a given set of parameters. For purposes of the example, it will be assumed that the rider's right leg is 0.5 inch shorter than the left, and thus the sum of the vertical offsets of the foot-supporting upper surfaces of the pedals will be 0.5 inch, that the radius of the chainwheel is 2 inches, and that the crank arm length measured from the center of the axle to the center of the pedal spindle is 170 millimeters (6.69 inches). The pedals are constructed so that the bottom of the ball of the right foot will be positioned one-quarter inch above the center of the right center spindle, and the bottom of the ball of the left foot will be positioned one-quarter inch below the center of the left pedal spindle. r′ is then calculated as follows:

$$r' = \frac{(2.0 \text{ inches})(6.69 \text{ inches} + 1/2(0.5 \text{ inch}))}{6.69 \text{ inches}}$$

$$r' = 2.075 \text{ inches}$$

The amount of offset is then calculated as r′−r=2.075 inches−2.0 inches=0.075 inch. The chainwheel 26 is thus offset 0.075 inch toward the pedal for the shorter leg.

The rider normally pedals in a circular motion to rotate the chainwheel 26 and thereby drive the bicycle 12. On rotation of the assembly 10, the pedals 32 and 33 will describe a circular movement which is shown in FIG. 3. The broken circle 42 shows the movement diagram for the bottom of the ball of the foot on the shorter leg, while the circle 44 shows the movement diagram for the bottom of the ball of the foot on the longer leg. As shown, the pedal 33 for the longer leg is at the 12:00 position and shows the ball of the foot offset below the pedal spindle. The pedal 32 for the shorter leg is at the 6:00 position and has the ball of the foot offset above the pedal spindle with the sole 46 of the shoe therebetween.

From the foregoing, it is to be appreciated that the net effect of positioning the chainwheel and pedals as just described is a more uniform application of force to the chain over the chainwheel 26 as the bicycle is pedaled. This allows for a smooth, steady and strong pedaling motion. An assembly constructed in accordance with the invention is capable of equalizing the power or force between legs of different lengths which is so desirable for serious bicyclists. The formula for determining the amount of chainwheel offset applies whether or not the foot-supporting surfaces are equally offset in opposite directions. For example, the foot-supporting surface for the shorter leg may be raised only, and the formula set forth herein applied to determine the amount of chainwheel offset. The present invention provides a chain and pedal assembly wherein efficient pedaling cadence or rhythm can be maintained, and which can also be easily customized for individual riders having a variety of leg length differences.

Although a particular embodiment of the invention has been described in detail for purposes of illustration, various modifications may be made without departing from the spirit and scope of the invention. Accordingly, the invention is not to be limited, except as by the appended claims.

I claim:

1. A bicycle crank and pedal assembly for a rider having one leg shorter than the other, the assembly comprising:

an axle rotatably mounted on a bicycle frame and common axis extending therethrough;

a first crank arm rotatable about the common axis and having a first end mounted to a first end of the axle and extending generally perpendicularly thereto to a second free end;

a first pedal rotatably mounted to the second free end of the first crank arm by a first pedal spindle which defines a first pedal axis of rotation;

a first upper surface for supporting a first foot of the rider over the first pedal, the first foot-supporting upper surface being vertically offset from the first pedal axis of rotation;

a second crank arm rotatable about the common axis and having a first end mounted to a second end of the axle and extending generally perpendicularly thereto in an opposite direction relative to the first crank arm, to a second free end;

a second pedal rotatably mounted to the second free end of the second crank arm by a second pedal spindle which defines a second pedal axis of rotation;

a second upper surface for supporting a second foot of the rider over the second pedal; and a chainwheel eccentrically fixed to the drive axle and rotatable about the common axis, the center of the chainwheel being offset from the common axis by a distance equivalent to r′−r, wherein r′ is determined by the formula, $$r' = \frac{r(R + 1/2(O_1 + O_2))}{R}$$

wherein "r"=radius of the chainwheel, "R" crank arm length measured from the common axis to the first pedal axis of rotation, "$O_1$" a vertical offset of the first foot-supporting upper surface from the first pedal axis of rotation, and "$O_2$"=a vertical offset of the second foot-supporting upper surface from the second pedal axis of rotation.

2. A bicycle crank and pedal assembly as set forth in claim 1, wherein the first foot-supporting upper surface is vertically offset upwardly from the first pedal axis of rotation.

3. A bicycle crank and pedal assembly as set forth in claim 2, wherein the chainwheel is offset in a direction toward the first pedal.

4. A bicycle crank and pedal assembly as set forth in claim 3, wherein the second foot-supporting upper surface is vertically offset downwardly from the second pedal axis of rotation.

5. A bicycle crank and pedal assembly as set forth in claim 4, wherein the first pedal includes a first pedal upper surface and the second pedal includes a second pedal upper surface, the first pedal upper surface being closer to the common axis than the second pedal upper surface when the crank arms are vertically disposed and the first pedal and the second pedal are each horizontally disposed.

6. A bicycle crank and pedal assembly as set forth in claim 5, including a shoe sole over the first pedal upper surface, wherein an upper surface of the shoe sole defines the first foot supporting upper surface.

7. A bicycle crank and pedal assembly as set forth in claim 5, including a shoe sole over the second pedal upper surface, wherein an upper surface of the shoe sole defines the second foot-supporting upper surface.

8. A bicycle crank and pedal assembly, comprising:
a drive axle rotatably mounted on a frame for a bicycle, and defining a common axis extending therethrough;
a first crank arm rotatable about the common axis and having a first end mounted to a first end of the drive axle and extending generally perpendicularly thereto to a second free end;
a first pedal rotatably mounted to the second free end of the first crank arm by a first pedal spindle which defines a first pedal axis of rotation;
a first upper surface for supporting a first foot of the rider over the first pedal, the first foot-supporting upper surface being vertically offset upwardly from the first pedal axis of rotation;
a second crank arm rotatable about the common axis and having a first end mounted to a second end of the drive axle and extending generally perpendicularly thereto in an opposite direction relative to the first crank arm, to a second free end;
a second pedal rotatably mounted to the second free end of the second crank arm by a second pedal spindle which defines a second pedal axis of rotation;
a second upper surface for supporting a second foot of the rider over the second pedal; and
a chainwheel fixed to the drive axle and rotatable about the common axis, the chainwheel being offset in a direction toward the first pedal and adapted to pull a chain as the drive axle is turned to move the bicycle.

9. A bicycle crank and pedal assembly as set forth in claim 8, wherein the second foot-supporting upper surface is vertically offset from the second pedal axis of rotation.

10. A bicycle crank and pedal assembly as set forth in claim 9, wherein the second foot-supporting upper surface is vertically offset downwardly.

11. A bicycle crank and pedal assembly as set forth in claim 10, wherein the first pedal includes a first pedal upper surface and the second pedal includes a second pedal upper surface, the first pedal upper surface being closer to the common axis than the second pedal upper surface when the crank arms are vertically disposed and the first pedal and the second pedal are each horizontally disposed.

12. A bicycle crank and pedal assembly as set forth in claim 11, including a shoe sole over the first pedal upper surface, wherein an upper surface of the shoe sole defines the first foot supporting upper surface.

13. A bicycle crank and pedal assembly as set forth in claim 11, including a shoe sole over the second pedal upper surface, wherein an upper surface of the shoe sole defines the second foot-supporting upper surface.

14. A bicycle crank and pedal assembly as set forth in claim 10, wherein the first foot-supporting upper surface is offset from the first pedal axis of rotation by the same distance that the second foot-supporting upper surface is offset from the second pedal axis of rotation.

15. A bicycle crank and pedal assembly as set forth in claim 10, wherein the chainwheel is offset from the common axis by a distance equivalent to $r' - r$, wherein $r'$ is determined by the formula $$r' = \frac{r(R + 1/2(O_1 + O_2))}{R}$$

wherein "$r$"=radius of the chainwheel, "$R$"=crank arm length measured from the common axis to the first pedal axis of rotation, "$O_1$"=the vertical offset of the first foot-supporting upper surface from the first pedal axis of rotation, and "$O_2$"=the vertical offset of the second foot-supporting upper surface from the second pedal axis of rotation.

16. A bicycle crank and pedal assembly, comprising:
a drive axle rotatably mounted on a frame for a bicycle, and defining a common axis extending therethrough;
a first crank arm rotatable about the common axis and having a first end mounted to a first end of the drive axle and extending generally perpendicularly thereto to a second free end;
a first pedal rotatably mounted to the second free end of the first crank arm by a first pedal spindle which defines a first pedal axis of rotation;
a first upper surface for supporting a first foot of the rider over the first pedal, the first foot-supporting upper surface being vertically offset upwardly from the first pedal axis of rotation;
a second crank arm rotatable about the common axis and having a first end mounted to a second end of the drive axle and extending generally perpendicularly thereto in an opposite direction relative to the first crank arm, to a second free end;
a second pedal rotatably mounted to the second free end of the second crank arm by a second pedal spindle which defines a second pedal axis of rotation;
a second upper surface for supporting a second foot of the rider over the second pedal, the second foot-supporting upper surface being vertically offset downwardly from the second pedal axis of rotation; and
a chainwheel fixed to the drive axle and rotatable about the common axis, the chainwheel being offset in a direction toward the first pedal and adapted to pull a chain as the drive axle is turned to move the bicycle;

wherein the chainwheel is offset from the common axis by a distance equivalent to $r'-r$, wherein $r'$ is determined by the formula $$r' = \frac{r(R + 1/2(O_1 + O_2))}{R}$$

wherein "r" = radius of the chainwheel, "R" = crank arm length measured from the common axis to the first pedal axis of rotation or the second pedal axis of rotation, which length will be the same for either, "$O_1$" = the vertical offset of the first foot-supporting upper surface from the first pedal axis of rotation, and "$O_2$" = the vertical offset of the second foot-supporting upper surface from the second pedal axis of rotation.

17. A bicycle crank and pedal assembly as set forth in claim 16, wherein the first pedal includes a first pedal upper surface and the second pedal includes a second pedal upper surface, the first pedal upper surface being closer to the common axis than the second pedal upper surface when the crank arms are vertically disposed and the first pedal and the second pedal are each horizontally disposed, the assembly further including a first shoe sole over the first pedal upper surface, wherein an upper surface of the first shoe sole defines the first foot-supporting upper surface, and a second shoe sole over the second pedal upper surface, wherein an upper surface of the second shoe sole defines the second foot-supporting upper surface.

* * * * *

UNITED STATES PATENT AND TRADEMARK OFFICE
CERTIFICATE OF CORRECTION

PATENT NO. : 5,361,649
DATED : November 8, 1994
INVENTOR(S) : Edwin J. Slocum, Jr.

It is certified that error appears in the above-identified patent and that said Letters Patent is hereby corrected as shown below:

```
In column 2, line 16,  delete "h as" and insert --has--.

In column 3, line 55, delete "-" and insert --.--.

In column 6, line 62, before "a" insert --=--.
```

Signed and Sealed this

Eleventh Day of April, 1995

*Attest:*

BRUCE LEHMAN

*Attesting Officer*      *Commissioner of Patents and Trademarks*